(12) United States Patent
Vecchia

(10) Patent No.: US 10,602,714 B2
(45) Date of Patent: Mar. 31, 2020

(54) PLANT FOR WASHING AND SANITISING THE UDDERS OF DAIRY ANIMALS

(71) Applicant: PULI-SISTEM S.R.L, Azzanello (Cremona) (IT)

(72) Inventor: Giuliano Vecchia, Azzanello (IT)

(73) Assignee: PULI-SISTEM S.r.L, Azzanello Cr (IT)

( * ) Notice: Subject to any disclaimer, the term of this patent is extended or adjusted under 35 U.S.C. 154(b) by 82 days.

(21) Appl. No.: 15/567,888

(22) PCT Filed: Apr. 22, 2016

(86) PCT No.: PCT/IB2016/000519
§ 371 (c)(1),
(2) Date: Oct. 19, 2017

(87) PCT Pub. No.: WO2016/170418
PCT Pub. Date: Oct. 27, 2016

(65) Prior Publication Data
US 2018/0116165 A1    May 3, 2018

(30) Foreign Application Priority Data

Apr. 23, 2015    (IT) .................. 102015902346095

(51) Int. Cl.
*A01J 7/04*    (2006.01)
*A46B 13/04*    (2006.01)
(Continued)

(52) U.S. Cl.
CPC ................ *A01J 7/04* (2013.01); *A46B 13/04* (2013.01); *B01D 53/04* (2013.01); *B01F 3/0446* (2013.01);
(Continued)

(58) Field of Classification Search
CPC .......... A01J 7/04; A01K 13/001; A46B 13/04; A46B 2200/1093; B01F 3/0446;
(Continued)

(56) References Cited

U.S. PATENT DOCUMENTS 6,464,867 B1 * 10/2002 Morita ................ B01F 3/04985
                                                    210/202
6,982,006 B1 *  1/2006 Boyers .................... A61L 2/183
                                                    134/1
(Continued)

FOREIGN PATENT DOCUMENTS

EP       0819388 A1    1/1998
WO       99/27775 A1   6/1999
WO       03/033180 A1  4/2003

OTHER PUBLICATIONS

International Search Report for PCT/IB2016/000519 dated Sep. 9, 2016.

*Primary Examiner* — Trinh T Nguyen
(74) *Attorney, Agent, or Firm* — Pearne & Gordon LLP

(57) ABSTRACT

Plant for washing and sanitising the udders of dairy animals of the type consisting of a control panel (1), for the management and the control of the entire plant, a tank (2) for water collection and delivery, a motor body (3) for plant management and a brush body (4) for animal treatment, characterised in that ozone generator (5), structure for ozone enrichment of the water delivered by said tank (2) and structure for drying the udders with ozone once the washing has been completed and furthermore provided.

6 Claims, 2 Drawing Sheets

Figure 1:
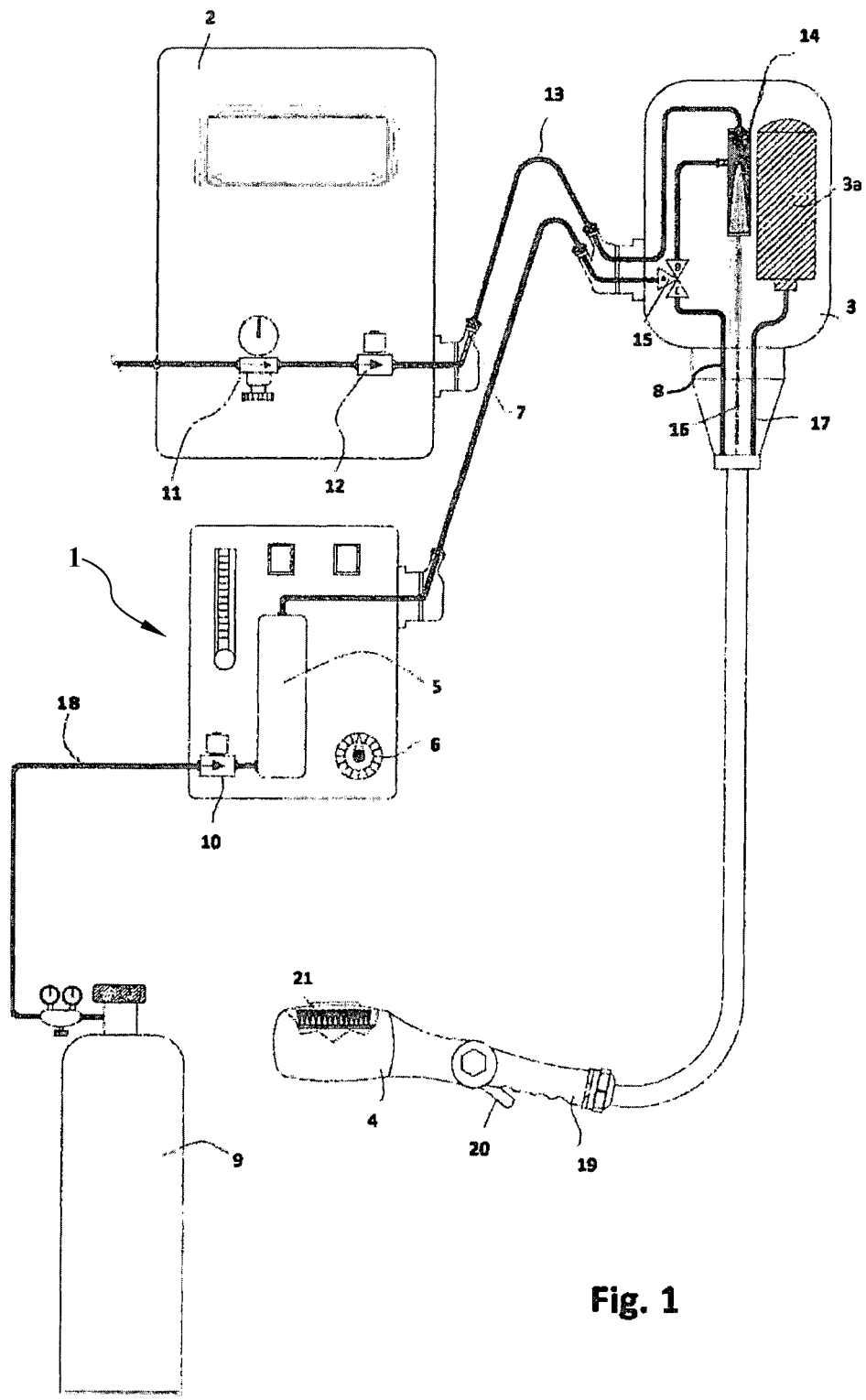

(51) Int. Cl.
*B01D 53/04* (2006.01)
*B01F 3/04* (2006.01)
*B01F 5/04* (2006.01)
*B01F 15/00* (2006.01)
*B01F 15/02* (2006.01)
*B08B 1/00* (2006.01)
*B08B 3/10* (2006.01)

(52) U.S. Cl.
CPC ...... *B01F 5/0413* (2013.01); *B01F 15/00974* (2013.01); *B01F 15/00993* (2013.01); *B01F 15/0261* (2013.01); *B08B 1/002* (2013.01); *B08B 3/10* (2013.01); *A46B 2200/1093* (2013.01); *B01D 2253/102* (2013.01); *B01F 2003/04886* (2013.01); *B01F 2215/008* (2013.01); *B01F 2215/0077* (2013.01); *B08B 2203/005* (2013.01)

(58) Field of Classification Search
CPC ................ B01F 5/0413; B01F 15/0261; B01F 15/00993; B01F 15/00974; B01F 2215/008; B01F 2003/04886; B08B 1/002; B08B 2203/005; B01D 2253/102; A61L 2/183; A61L 2/202
See application file for complete search history.

(56) References Cited

U.S. PATENT DOCUMENTS

| | | | |
|---|---|---|---|
| 2005/0005954 A1* | 1/2005 | Barani | A61L 2/183 134/94.1 |
| 2007/0163935 A1* | 7/2007 | Chewins | A61L 2/0088 210/198.1 |
| 2010/0139723 A1* | 6/2010 | Torgerson | A01J 7/04 134/57 R |
| 2012/0240865 A1 | 9/2012 | Dole | |
| 2014/0090606 A1* | 4/2014 | Heacox | A01K 1/12 119/603 |

* cited by examiner

PLANT FOR WASHING AND SANITISING THE UDDERS OF DAIRY ANIMALS

This is a National Stage application of PCT international application PCT/IB2016/000519, filed on Apr. 22, 2016 which claims the priority of Italian application no. 102015902346095 entitled "PLANT FOR WASHING AND SANITISING THE UDDERS OF DAIRY ANIMALS", filed Apr. 23, 2015, both of which are incorporated herein by reference in their entirety.

The present invention relates to a plant for washing and sanitising the udders of dairy animals, adapted for the hygienisation and the sanitization of the areas prone to treatment.

It is known by farmers that the area surrounding udders before milking is often filthy with manure. Therefore, it is necessary to clean the area with precision. Furthermore, dairy animals are subjected to udder infections, typically caused by the permanence of milk residues and by the inherent weakness due to the solicitations of milking, both natural in nature and due to the action of appropriate milking machines, along the entire surface, which concerns the udder.

Therefore, people always looked for solutions to make a rapid and precise cleaning of the udder, both before and after milking. Particularly, cleaning devices, provided with particular solutions, have been studied in order to ensure a proper and complete cleaning of the surfaces involved in milking.

Typically, these devices consist of a motor body to which a brush body having rotating brushes is associated. At the brushes there are delivery conduits of disinfectant and detergent solutions to increase the chances of keeping the animal's udder clean and, therefore, more resistant to pathogens.

To make the cleaning activity effective, particular, geometries of the brush arrangement inside the brush body have been studied in order to ensure the complete and proper cleaning of the areas prone to infections. The brushes, constantly wetted by the disinfectant substances, provide a constant washing and sanitising.

Recently, it has been observed that the substances used to date are not always able to give sufficient disinfection guarantees, while causing important material management problems, given the stringent sanitary directives in this area.

Moreover, sanitary directives are particularly complex also for the storage of detergent substance stocks, and often force farmers to arrange areas only for such usage.

Therefore, it was decided to change the conventional detergents with ozonated water. In particular, US 2012/1503 discloses a method for ozone delivering that provides the spraying of ozonated water directly on a surface to be disinfected, such as a cloth or a part of an animal.

However, when the ozone is sprayed directly on an udder filthy with manure or milk, the ozone is consumed with remarkable speed, without completing the descaling.

Therefore, it is clear that the plant has been provided and designed exclusively for the sanitising of the udders before milking and after a washing carried out in another way. In this regard, it is extremely clear that the use of a towel to clean the udder is insufficient to ensure sufficient ozone for the disinfection of the udder.

Object of the present invention is, therefore, to provide a system to sanitise and disinfect, which is effective in all phases of the animal's hygiene management, i.e. prior to milking and after milking, and which provides the least number of operations to be performed by the operator.

Further object is to make use of a substance that disinfects in an appropriate manner and, at the same time, does not require complex activities of rinsing and waste water treatment, thus being little invasive for the farmers.

Said objects are obtained by a plant for washing and sanitising the udders of diary animals of the type consisting of a control panel, for the management and control of the entire plant, a tank for water collection and delivery, a motor body for plant management and a brush body for animal treatment, characterized in that ozone generation means, means for ozone enrichment of the water delivered by said tank and means for drying the udders with ozone once the washing has been completed are furthermore provided.

Other preferred features of the solution according to the model are described in the dependent claims.

Figure 2:
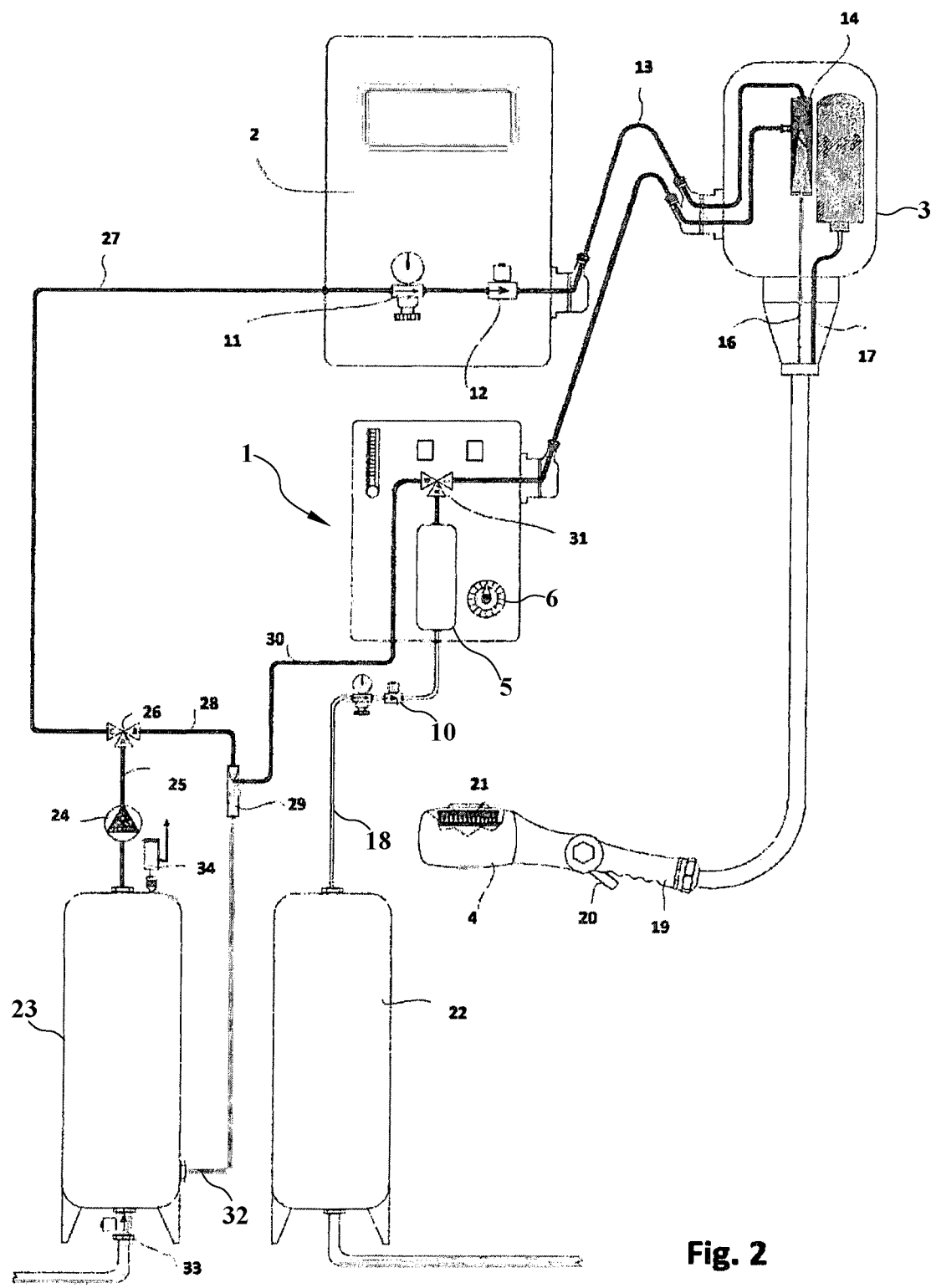

The plant is now described in greater detail in a preferred embodiment, with reference to the attached figures, in which FIG. 1 is a schematic view of a plant according to a preferred embodiment of the invention, and FIG. 2 is a schematic view of a plant according to a second preferred embodiment of the invention.

The plant according to a preferred embodiment illustrated in FIG. 1 consists of a control panel 1, for the management and control of the entire plant, a tank 2 for water collection and delivery, a motor body 3 for plant management and a brush body 4 for animal treatment. These elements are connected together by means of power cables of the various components necessary to the operation of the plant itself.

Below, the various elements just mentioned will be defined more precisely, in order to understand the structure and operation.

The inner part of the control panel 1 houses an ozone generator 5, which can be controlled by means of a clock 6, and an ozone transmission conduit 7 to the motor body 3. Moreover, to allow the ozone creation, an oxygen transmission conduit 8, coming from an oxygen tank 9, is connected to said control panel 1. The oxygen flow into the ozone generator 5 is also defined by a solenoid valve 10 provided preferably inside said panel body 1.

Likewise, the tank 2 includes a water delivery line controlled by a tap 11 and a flow controlling solenoid valve 12 towards the motor body 3. The conduit 13, which emerges from the tank 2, is directly connected to a Venturi injector 14 located inside the motor body 3 and having essentially the function of mixing the water with the ozone coming from the conduit 7, which is delivered by a three-way valve 15. The so-obtained mixture is transmitted through the conduit 16 to the brush body 4. Encased in a sheath together with the conduit 16 are the hose 17 for electric energy transmission, which departs from the motor 3a of said motor body, and an ozone transmission conduit 18 connected to said three-way valve 15. These three conduits manage the proper operation of the brush body 4.

The brush 4 finally consists of a grip 19, on which there is a relief activation button 20 and a series of actual brushes 21 housed in the hollow area provided in a distal position to the brush 4 itself, as it has long been known in the industry.

In the solution of FIG. 2, the method for the preparation of the mixtures to be forwarded to the motor body 3 is modified substantially and, consequently, the entire architecture of their realization system is changed, while the architecture and the operation, downstream of the control panel 1 and the water delivery tank 2, remains substantially the same.

Compared to the solution of FIG. 1, the compliant washing and sanitization plant shown in FIG. 2 provides a more complex structure, suitable to allow the continuous recirculation of the substances.

In place of the oxygen tank 9 is provided an air tank 22, which comes in any case, by means of the conduit 18 and according to the solenoid valve adjustment 10, to the ozone generator 5. Upstream of the water tank 2, it is also provided a tank 23 containing a mixture of water and ozone, which is sent—at the opening of a recirculation valve 24 disposed along a conduit 25 to transport the mixture contained in the tank 22—to a three-way valve 26; from this latter, an ozone-enriched water delivery conduit 27 to the tank 2 departs as well as a connecting conduit 28 with a Venturi mixer 29.

To said Venturi mixer 29 a conduit 30 is also connected, coming from the ozone generator 5, connected to the other end with a three-way valve 31 arranged downstream of said ozone generator 5.

From the Venturi mixer 29 a conduit 32 departs, which enters into the tank 23.

A recirculation pump 33 controls the water inflow to the tank 23 as to ensure the proper mixture amount inside it. To avoid the excess of ozone concentrations in the mixture, an active-carbon filter 34 for the delivery into the atmosphere of excess ozone is furthermore provided.

The so-realized plant has an operation easy to understand.

In the first embodiment, once the voltage has been supplied to the switch of the line, the plant is ready to use. As a result of the pressure on the activation button 20 of the brush 4, the ozone generator 5 is activated. Subsequently, the solenoid valve 10 and the solenoid valve 12 are opened, and the three-way valve 15 is adjusted so that the ozone and the water access simultaneously to the Venturi injector 14. The mixture of ionized water is then pumped through the conduit 16 to the brush body 4, and in particular at the brushes 21.

Now, the washing of the nipple takes place in a conventional manner, with a particular type of detergent. The ozone is delivered directly on the udder and on the brush bristles, so that the entire surface that has to undergo the cleaning and sanitisation treatment is wetted by the desired disinfectant substance.

Once the washing operations have been completed, the button 20 is released, by activating a timing system of the motor 3a and the ozone generator 5, so that the ozone delivery continues towards the brush. However, simultaneously with the release of the button 20, the solenoid valve 12 of the water is closed and the arrangement of the three-way valve 15 is modified so that the ozone comes through the conduit 8 to the brush body 4.

The ozone jet that spreads on the udder gets the double purpose of drying the washed surface and ensuring the sanitisation of the nipple.

In the second version, once the voltage has been supplied to the switch of the line, the ozone generator 5 and the recirculation pump are activated.

It is well understood that the so-realized plant structure is to ensure the maximum hygiene and maximum comfort for the user, with a considerable reduction in costs and processing times.

It is thus clear that the intended purposes have been achieved: the so-realized plant can indeed increase the hygiene of the udder, consequently reducing the risk of infections.

In fact, the association of spraying ozone directly on an udder filthy with manure and milk with the use of a suitably structured brush body, allows the correct and rapid removal of manure and milk.

Thanks to the scrapping action of the brushes together with the constant ozone application on the area subjected to cleaning, the skin of the animals is effectively cleaned with great care and—immediately after—sprayed with the ozone solution that constitute a sort of protective film on the skin of the udder, a particularly irritable area and, therefore, easily prone to infections.

Finally, the direct delivery of ozone-enriched air on the udder, allows—compared to prior art plants—cancelling the risk that other means commonly used for the drying can carry diseases.

In other words, the deposition of ozone-enriched water has the same function as a final rinse, when the udder is perfectly free from filth and infection elements.

Furthermore, the treatment to which the animal is subjected before milking, aimed at avoiding the introduction of pathogens in the milk, allows the immediate attach of the milking unit on the cow, since the humidity of the udder due to water and ozone, without other disinfecting agents, is not harmful: indeed, the ozonated water does not leave residues.

It is, thus, obtained a cleaning system for the udder particularly safe and effective, far better than those currently on the market.

The previous description is intended to illustrate two particularly preferred embodiments of the invention. However, modifications or similar forms which fall within the scope of the invention as defined by the appended claims may be provided.

The invention claimed is:

1. A plant for washing and sanitising udders of dairy animals, the plant comprising:
   a control panel for the management and the control of the plant;
   a water tank for water collection and delivery;
   a motor body for plant management;
   a brush body for animal treatment;
   an ozone generator supplied by an air tank;
   a Venturi injector configured to enrich water, delivered by said water tank, with ozone; and
   a mixture tank containing a mixture of water and ozone, the mixture tank provided upstream of said water tank, wherein from three-way valve means, a first ozone delivery conduit and a second ozone delivery conduit depart to the Venturi injector and a Venturi mixer, respectively, and wherein an ozone-enriched water conduit is connected to the Venturi mixer, and wherein a mixture conduit departs from the Venturi mixer and is connected to the mixture tank.

2. The plant as in claim 1, wherein the three-way valve means are provided for deviating an ozone flow, produced by said ozone generator.

3. The plant as in claim 1, further comprising a recirculation pump configured to adjust a water inflow to the mixture tank is furthermore provided.

4. The plant as in claim 1, further comprising an active-carbon filter provided on the mixture tank and configured to deliver excess ozone into the atmosphere.

5. The plant as in claim 1, further comprising an injector conduit departing from the Venturi injector and a hose for electric energy transmission which departs from a motor of said motor body, wherein the injector conduit and the hose are encased in a sheath.

6. The plant as in claim 1, wherein said brush body comprises a grip on which there is a relief activation button, and a series of actual brushes housed in a hollow area provided in a distal position.

* * * * *